PHASE CODED SIGNAL RECEIVER

Filed April 11, 1957 3 Sheets-Sheet 1

INVENTORS
ROBERT L. FRANK
SOLOMON ZADOFF
BY
ATTORNEY

July 2, 1963 R. L. FRANK ETAL 3,096,482

PHASE CODED SIGNAL RECEIVER

Filed April 11, 1957 3 Sheets-Sheet 2

INVENTORS
ROBERT L. FRANK
SOLOMON ZADOFF
BY *[signature]*
ATTORNEY

INVENTORS
ROBERT L. FRANK
SOLOMON ZADOFF
BY R. V. Craddock
ATTORNEY

United States Patent Office
3,096,482
Patented July 2, 1963

3,096,482

PHASE CODED SIGNAL RECEIVER

Robert L. Frank, Great Neck, and Solomon Zadoff, Flushing, N.Y., assignors to Sperry Rand Corporation, a corporation of Delaware Filed Apr. 11, 1957, Ser. No. 652,310
9 Claims. (Cl. 325—41)

The present invention generally relates to communication systems utilizing phase coded pulsed carrier signals, and more particularly, to receiving means for use in such systems for unambiguously identifying a desired one of said phase coded pulsed carrier signals.

In co-pending U.S. application Serial Number 650,534, filed on April 3, 1957, in the name of Robert L. Frank and assigned to the present assignee, now Patent No. 2,949,113, there is disclosed a phase coded communication system for the transmission of information in the form of discrete phase modulation of a transmitted carrier. Phase coding is defined therein as the method of introducing discrete phase shift in a transmitted carrier signal during the time interval between successive pulses of the carrier signal. It has been found that certain systemic advantages are obtainable via the technique of phase coding when the discrete phase shift, successively introduced into the transmitted carrier, follows particular predetermined phase sequences relative to the phase of an arbitrary continuous wave signal. For example, by the utilization of particular phase codes providing for such predetermined phase sequences, the problem of distinguishing between a desired phase coded signal and other signals is simplified to a considerable degree.

In the aforementioned co-pending patent application, it is shown that when the transmitted signal is cross-correlated at a receiver with a locally generated phase coded reference signal having the same phase progression pattern, a unique output, namely, a D.C. output signal is produced only in the event that the locally generated phase coded reference signal is in precise time alignment with the received phase coded signal.

The unique receiver output, produced upon alignment of the received and reference signals, is utilized in the present invention for the purpose of distinguishing unambiguously the presence of a desired one of a plurality of phase coded received signals.

It is the general object of the present invention to provide receiver means adapted to receive and operative to unambiguously distinguish between a plurality of phase coded pulsed carrier signals.

Another object is to provide signal detection apparatus adapted to receive two phase coded pulsed carrier signals, one of which signals may be represented by a matrix whose columns are cyclic permutations of the columns of the matrix defining the other signal, and to reject the signal represented by a selected one of said matrices.

A further object is to provide signal detection apparatus of a phase responsive type whose output is diverted into two separate signal integrators, depending upon the time of occurrence of the received signals, together with means for individually and jointly monitoring the amplitude of the two integrated signals.

These and other objects of the present invention, as will be seen more clearly from the following description, are achieved by the provision of a receiver for use in a phase coded pulsed carrier communication system, the receiver being adapted to receive a plurality of phase coded signals and operative to produce an unambiguous indication upon the reception of a predetermined one of said phase coded signals.

Each of the phase coded signals, as more fully described in co-pending U.S. patent application Serial No. 650,534 is definable in terms of a matrix having N rows and N columns. The terms comprising the matrix represent the phase of corresponding signals relative to the phase of an arbitrary continuous wave signal. The receiver of the present invention is particularly adapted to unambiguously respond to a desired one of a plurality of phase coded signals each of which other phase coded signals is defined in terms of the same basic matrix as defines the desired signal but wherein the columns of the matrix have been cyclically permutated.

In a preferred embodiment of the present invention, the receiver embodies a signal detector wherein the received phase coded signals are cross-correlated with a locally generated reference signal defined by precisely the same matrix as describes the desired signal. The output of the cross-correlating detector is diverted to one of two signal channels, each channel embodying a signal integrator. Operation of the signal diverting means is so synchronized, relative to the time of arrival of the phase coded signals at the receiver, that signals arriving during a first time interval are exclusively diverted to a first signal integrator while those signals arriving in a successive time interval are entirely diverted to the second signal integrator.

The outputs of the two signal integrators are separately monitored as to amplitude. When the pre-established condition is fulfilled that both signal integrators produce a simultaneous output of the same polarity, an indicator is energied to signify unambiguously that the desired phase coded carrier signal is being detected.

For a more complete understanding of the invention, reference should be had to the following description and the appended drawings of which:

Figure 1:
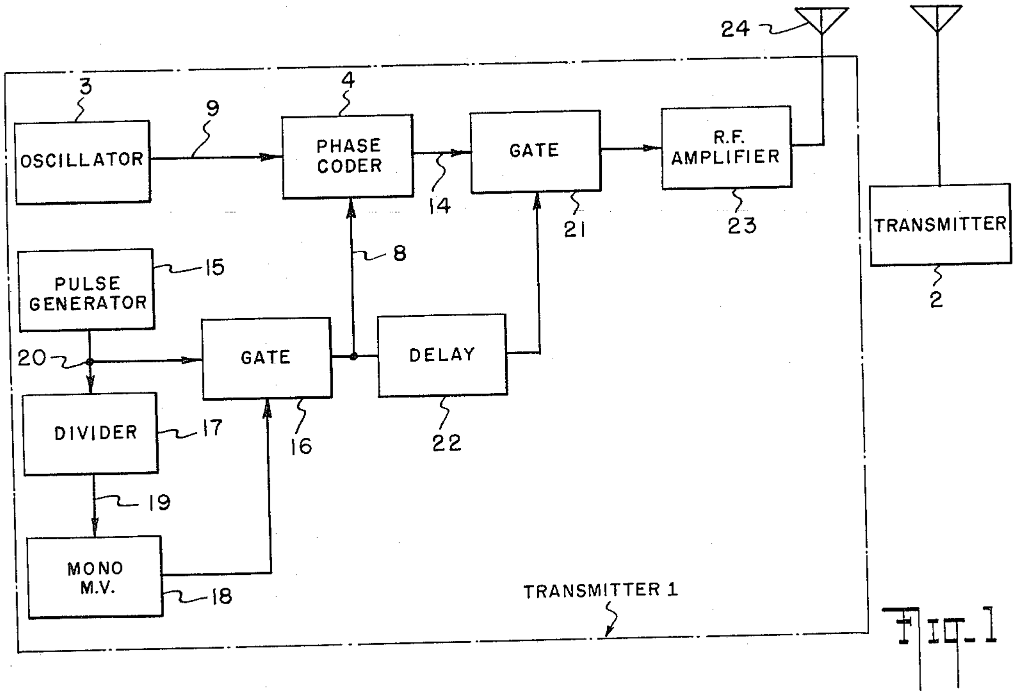
FIG. 1 is a representative embodiment of a phase coded pulsed carrier signal transmitter for use in the present invention.

In FIG. 1, two signal transmitters for producing the phase coded pulsed carrier signals utilized by the present invention are generally designated by the numerals 1 and 2. Transmitter 2 contains apparatus within it which substantially duplicates the component apparatus of transmitter 1 and for that reason is not shown in detail.

Figure 3:
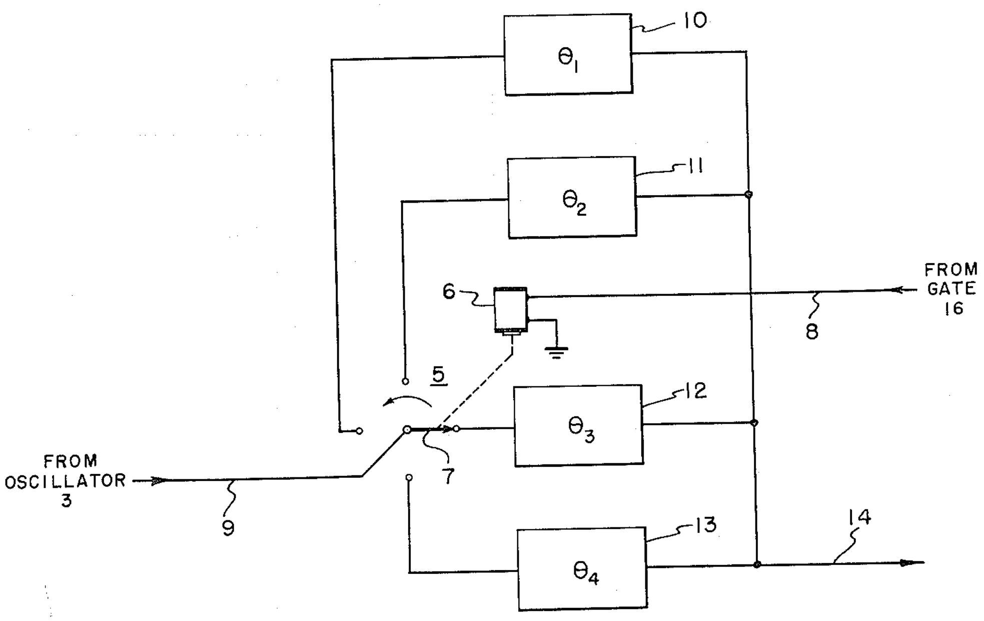
FIG. 3 is a block diagram, partially in schematic form, of an illustrative phase coder for use in FIGS. 1 and 5.

In transmitter 1, a source of carrier signals is generally represented by oscillator 3 whose signal output is applied to a first input of phase coder 4. Phase coder 4 may take the form of the apparatus disclosed in FIG. 3. In FIG. 3, stepping switch 5 is driven by means of stepping relay 6 so that the movable arm 7 is advanced one contact position in response to individual pulses as may be applied via line 8. The signal input to the phase coder of FIGS. 1 and 3 is applied by line 9 which is derived from oscillator 3 of FIG. 1. Four phase shift networks 10, 11, 12, and 13 are arranged to have one input of each connected to a corresponding contact terminal of stepping switch 5; the output terminals thereof are commonly connected together. The amounts of phase shift produced by networks 10, 11, 12, and 13 are adjusted to occur in predetermined amounts and in the order determined by the discontinuous stepping rotation of movable arm 7 of stepping switch 5.

Figure 4:
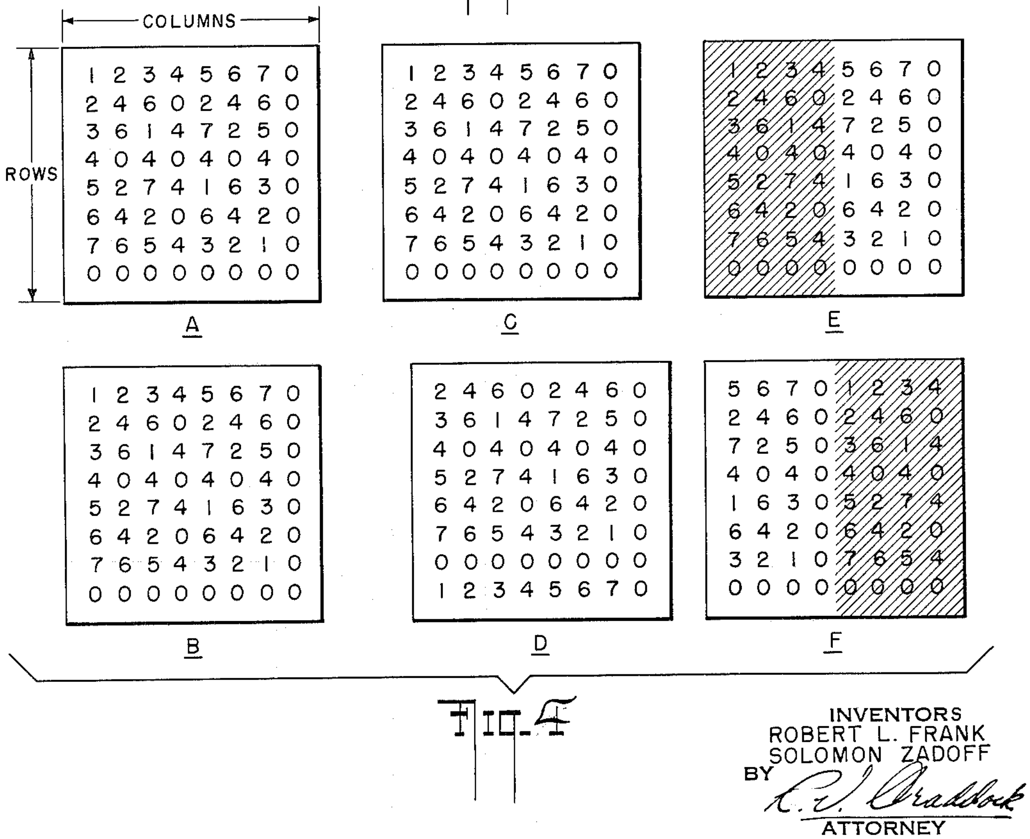
FIG. 4 is a series of matrices defining the phase progression pattern of typical phase coded pulsed carrier signals which may be utilized by the present invention.

Matrix A, for example, of FIG. 4 is a representative matrix generally defining the phase and phase progression of the output signals of a phase coder similar to the one shown in FIG. 3. Only four contact positions and four phase shift networks are shown for the sake of simplicity and clarity in FIG. 3, it being understood that the number of contact positions and associated phase shift networks can be extended to any arbitrary amount depending on the total number of phase coded signals to be produced during one complete cycle of rotation of movable arm 7 of stepping switch 5. The four-position coder of FIG. 3 produces a repetitive series of four phase coded signals identifiable by the relatively simple four pulse matrix $$\frac{1\ 2}{2\ 4}$$

The four matrix numerals 1, 2, 2, and 4 are multiplying coefficients of a basic phase angle utilized throughout the matrix. In accordance with the teachings of the aforementioned copending application S.N. 650,534, the basic angle in this case may have the value of 180°. Thus, the matrix actually represents a repetitive sequence of four signals bearing the respective phases of 180° (1×180°), 0° (2×180°), 0° (2×180°), and 0° (4×180°) relative to the phase of the input signal applied to movable arm 7 of stepping switch 5. It will be observed, with reference to FIG. 3, that the phase of the output signals appearing on line 14, relative to the phase of the input signal applied to line 9, will be determined by the amount of phase shift interposed by the particular phase shift network with which movable arm 7 of stepping relay 5 is momentarily in contact.

Returning to matrix A of FIG. 4, a cyclically repeating series of 64 phase coded pulsed carrier signals is represented. The 64 pulse sequence of matrix A is a species of the phase coded signals disclosed in application S.N. 650,534 and preferred for use in the present invention. Said 64 pulse sequence may be produced by a 64 contact position coder similar to the 4 contact position coder of FIG. 3. Moreover, the 64 pulses are produced in groups of eight, that is, the time separation between successive groups of eight pulses is greater than the time separation between individual pulses comprising any one group. The numbers shown in matrix A are multiplying coefficients of a basic phase angle utilized throughout the matrix.

Assuming, for example, that a basic phase angle of 135° is employed, the first eight pulses produced will bear successive carrier phase angles of 135° (1×135°), 270° (2×135°), 405° (3×135°) . . . and so on as measured relative to the phase of an arbitrary continuous wave signal. In other words, the phase progression of the first eight pulses represented by the first row of matrix A will be in steps of one.

The second eight pulses represented by the second row of matrix A will advance in steps of two units of phase shift. It will be observed that inasmuch as the values of the terms of the matrix are congruent for multiples of 8, the phase progression of the second group of eight pulses will follow the order indicated, namely, 2, 4, 6, 0, 2, 4, 6, 0. It can be seen that in order to produce the 64 phase coded pulse carrier signals represented by matrix A, the number of the phase shift networks shown in FIG. 3 must be extended to 64 with a corresponding extension in the number of contacts of stepping switch 5 that movable arm 7 will be successively connected with during one complete rotation.

Returning to FIG. 1, a source of pulses having a predetermined repetition rate is generally represented by the numeral 15. The output of generator 15 is jointly applied to divider 17 and a first input to gate 16. Divider 17 is adjusted to produce an output pulse in response to a predetermined number of input pulses. The output of divider 17 is applied to monostable multivibrator 18 which produces an output pulse of predetermined duration in response to an applied pulse. More specifically, the time constant of multivibrator 18 is adjusted to produce an output voltage pedestal having a duration equal to a time interval during which a predetermined number of pulses will be produced by generator 15. For the sake of consistency with the aforementioned matrix A of FIG. 3, it is assumed that the output voltage pedestal from multivibrator 18 will last for an interval equaling the time interval of eight successive pulses as produced by generator 15. The output voltage pedestal of multivibrator 18 renders gate 16 conductive so as to pass eight successive pulses from generator 15 therethrough.

Figure 2:
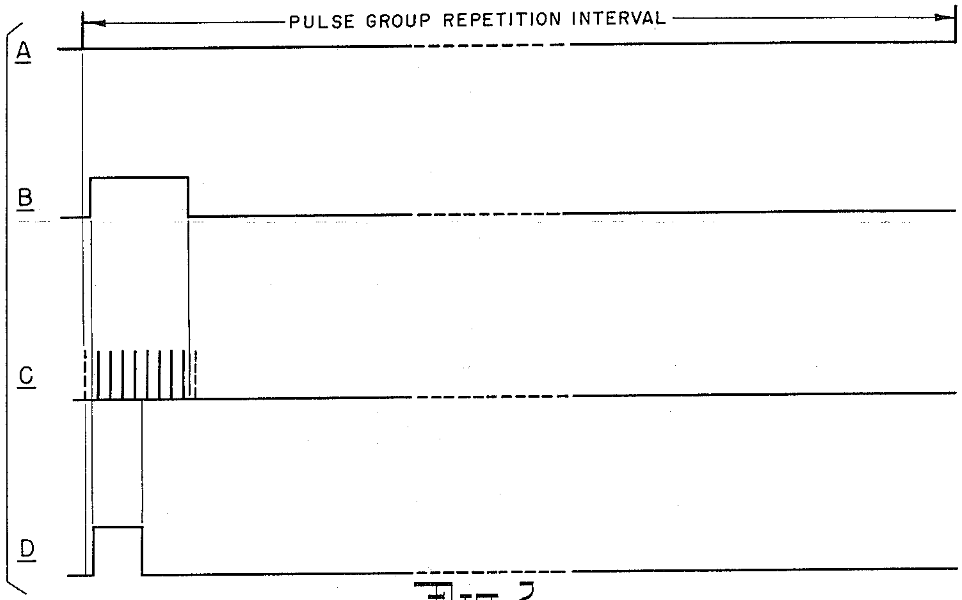
FIG. 2 is a series of waveforms useful in explaining the operation of the apparatus of FIGS. 1 and 5.

The time relationships of the various waveforms just mentioned are shown in FIG. 2. Waveform A depicts two output pulses from divider 17 of FIG. 1 as they appear on line 19; one repetition interval is shown. Each pulse of waveform A will trigger multivibrator 18 which, after a very small inherent time lag, will generate waveform B. Waveform C shows a portion of the continuous sequence of pulses appearing on line 20 at the output of generator 15. It can be seen that the pulse group of waveform C indicated by solid lines will be passed by gate 16. The dotted pulses indicate the immediately preceding and succeeding pulses not passed by gate 16.

Referring to FIG. 1, the gated group of output pulses from gate 16 are applied to the stepping input of phase coder 4, which input is designated by the numeral 8 in FIG. 3. The phase coded carrier signal appearing at the output of coder 4 on line 14 is applied to the signal input of gate 21, a switching input to which is derived from the gated pulse output of gate 16 via delay 22. The purpose of delay 22 is to permit the diminution of transients, produced during the switching operation of phase coder 4, before permitting the phase coded signals to pass through gate 21. Gate 21 is rendered conductive by the grouped output pulses from delay 22. The phase coded pulsed carrier signals at the output of gate 21 are amplified as by amplifier 23 and radiated by antenna 24.

As previously mentioned, transmitter 2 of FIG. 1 comprises substantially the same apparatus as that shown within transmitter 1. The only essential difference, according to the present invention, is that its component phase shift networks (corresponding to networks 10, 11, 12, and 13 of FIG. 3) are adjusted to produce a phase progression pattern definable by a matrix containing columns which are cyclically permutated with respect to the columns of the matrix generated by phase coder 4. For example, matrix E of FIG. 4 will be seen to be the duplicate of matrix A previously described. For purposes of definition, it is assumed that matrix E represents the desired signal to which the rectiver of the present invention is to be uniquely responsive. Matrix F of FIG. 4 describes a second series of phase coded pulse carrier signals to which the receiver of the present invention is not to respond.

It will be observed that matrix F of FIG. 4 has been derived from matrix E by the cyclic permutation of the unshaded columns of matrix E so that the shaded and unshaded portions thereof are interchanged. In terms of the phase coder embodied in transmitter 2 of FIG. 1, matrix F may be generated by the simple expedient of re-adjusting the amount of phase shift introduced by the component phase shift networks (similar to networks 10, 11, 12, and 13 of FIG. 3) or by rearranging the order in which they are connected to their respective contacts of stepping switch 5.

Figure 5:
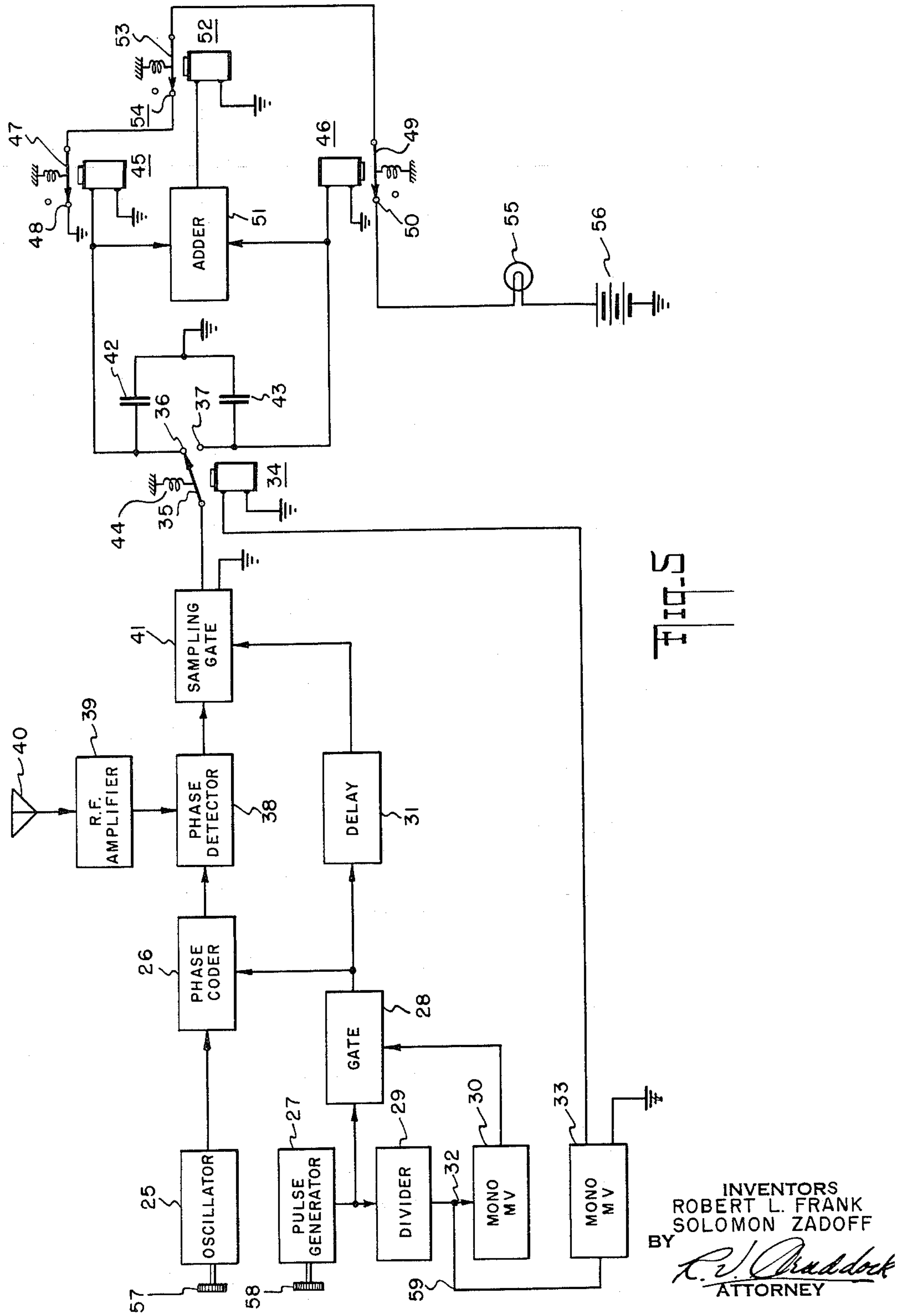
FIG. 5 is a block diagram, partly in schematic form, of the signal receiving apparatus of the present invention.

The receiving apparatus of the present invention is disclosed in the representative embodiment of FIG. 5. Oscillator 25, phase coder 26, pulse generator 27, gate 28, divider 29, monostable multivibrator 30 and delay 31 correspond both in structure and in operation, respectively, to oscillator 3, phase coder 4, pulse generator 15, gate 16, divider 17, monostable multivibrator 18 and delay 22 of FIG. 1. For the purpose of synchronizing the locally generated reference signal with the desired one of the received phase coded pulsed carrier signals, oscillator 25 and pulse generator 27 are shown as being manually adjustable in frequency as by control knobs 57 and 58 respectively. Synchronization can be achieved by first adjusting receiver oscillator 25 to the known frequency of transmitter oscillator 3. Receiver pulse generator 27 is then adjusted to a frequency slightly different from the known frequency of transmitter pulse generator 15 which causes the stepping rate of coder 26 to be somewhat different from the stepping rate of coder 4. In due course because of the different stepping rates, the movable arm of the stepping switch of coder 26 will be brought into alignment with the corresponding arm of coder 4. This alignment will be evidenced by the energization of lamp 55, in a manner to be described later. As soon as lamp 55 is energized, the repetition rate of receiver generator 27 is immediately adjusted to the known repetition rate of transmitter generator 15 to maintain synchronization of the respective coder arms.

The phase coded pulsed carrier signals are received and amplified by antenna 40 and RF amplifier 39, respectively, and applied to the signal input of phase detector 38 whose reference signal input is derived from the output of phase coder 26. Referring to FIG. 4 and as previously mentioned, it is assumed that matrix E defines the desired phase coded carrier signal as well as the reference signal applied to phase detector 38. It is further assumed, for the purpose of explaining the operation of the receiving apparatus of FIG. 5, that one or more phase coded pulsed carrier signals defined by matrix F are also received.

As more fully described in the aforementioned co-pending application U.S. Serial No. 650,534, a signal having a D.C. component is produced at the output of phase detector 38 only in the event that the two input signals applied thereto are in precise time alignment. The arrangement of matrix A and matrix B of FIG. 4 illustrates such a case wherein matrix B represents the received signal and matrix A represents the reference signal input to phase detector 38.

The utility of the D.C. signal component that is produced only in the event of precise time alignment between the matrices defining the phase coded signal inputs to phase detector 38 may be demonstrated as follows. In certain types of communication systems for example, in hyperbolic navigation systems such as loran, it is desirable to achieve phase coherence between a remotely situated secondary timing standard and a predetermined one of a plurality of highly precise primary timing standards. In the case of a loran system, for example, the predetermined primary and the secondary timing standards may be, respectively, a master transmitter carrier oscillator (such as oscillator 3 of FIG. 1) and a receiver local oscillator (such as oscillator 25 of FIG. 5).

The phase coding of the signals contemplated by the present invention may be considered to be a medium for the discriminatory reception by the receiver of FIG. 5 of information respecting the phase of the carrier signal generated by oscillator 3 of FIG. 1. The received carrier phase information is employed in achieving phase coherence between oscillator 25 of FIG. 5 and oscillator 3 of FIG. 1. The presence of a D.C. signal component at the output of detector 38 of FIG. 5 signifies the attainment of coherence between the received phase coded signal and the reference phase coded signal applied thereto. This, in turn, indicates that phase coherence has been established between oscillator 25 of FIG. 5 and oscillator 3 of FIG. 1.

As will be seen from the following description, the same signal phase coding technique is utilized in the present invention to discriminate against the phase coded signals being received by the receiver of FIG. 5 from transmitter 2 of FIG. 1. Such discrimination against the signals of transmitter 2 is a prerequisite to the unambiguous establishment of phase coherence between oscillator 25 of FIG. 5 and oscillator 3 of transmitter 1 of FIG. 1.

In said co-pending application it was shown that in the event that the received and reference signal matrices were misaligned in row or in column or in both row and column, no D.C. component is produced at the output of phase detector 38. A general case of matrix misalignment is illustrated by matrices C and D showing, for example, misalignment of one row and one column, i.e., the first row of matrix C appears as the last row of matrix D while the left hand column of matrix C occurs at an earlier time with respect to the occurrence of the corresponding left hand column of matrix D. The time misalignment of matrices C and D may occur when the receiving apparatus of FIG. 5 is first energized at an arbitrary time relative to the generation of the phase coded carrier signals by the transmitting apparatus of FIG. 1.

As is well known in the phase detector art, the output signal from a phase detector is substantially proportional to the product of the cosine of the phase angle between the reference and signal inputs thereto and the amplitude of the signal input, i.e., the product of the matrices C and D. It was shown in the aforementioned patent application that the average of the sum of the products obtained by multiplying the individual terms of the corresponding columns of the matrices is zero when the columns being multiplied are not precisely the same.

In the event that the desired phase coded carrier signal, as represented by matrix B, is applied to phase detector 38 at precisely the same time that a reference signal, represented by matrix A is applied thereto, an output signal having a D.C. component will be produced. Inasmuch as the received phase coded signals are in the form of grouped pulses, somewhat similar to the grouped pulses of waveform C of FIG. 2, the output of phase detector 38 will also be in the form of grouped pulses having amplitudes substantially proportional to the cosine of the phase angle between the carriers of the two applied coded signals.

The amplitudes of the grouped pulse output of phase detector 38 will be maximum when the phase angle between the two signals applied thereto is equal to either 0° or 180° and will be zero when said phase angle is 90° or 270°. The absence of output in the relatively rare latter case, despite the time alignment of the matrices defining the two input signals to phase detector 38, may be circumvented by the provision of a second receiving channel including a second phase detector whose phase coded reference signal is placed in phase quadrature with the reference signal of phase detector 38. When the same received signal is applied to both the second detector and detector 38 and the output of each phase detector is vectorally combined, the combined output will not be sensitive to any constant phase angle between the received signal and reference signal but will be sensitive only to the time alignment therebetween.

The groups of pulses produced at the output of gate 28 are applied to the control input of sampling gate 41 via delay 31. Thus, the grouped pulse output signals of phase detector 38 are sampled by means of slightly delayed synchronous sampling triggers as derived from delay 31. The sampled grouped pulses are applied to movable arm 35 of synchronous switch 34.

The driving signal for synchronous switch 34 is derived from monostable multivibrator 33 which produces an output voltage pedestal of predetermined duration in response to input pulses as applied thereto via line 59 which is connected to the output of divider 29. Multivibrator 33 operates in a fashion similar to that of multivibrator 30 except that its output voltage pedestal has a duration of half that produced by multivibrator 30. The output of multivibrator 33 is shown as waveform D of FIG. 2.

Arm 35 of synchronous switch 34 is mechanically biased, as by means of restraining spring 44, so that arm 35 normally contacts terminal 36 when the relay of synchronous switch 34 is de-energized. Said relay is energized only for the interval of time over which the positive pedestal portion of waveform D of FIG. 2 exists. Thus, the first four pulses, appearing at the output of sampling gate 41 and occurring during the interval of waveform D are directed to terminal 37 via the arm of the energized synchronous switch 34. The last four pulses of waveform C of FIG. 2, representing the last half of the grouped pulse output of sampling gate 41, are diverted to terminal 36 by means of arm 35 of de-energized synchronous switch 34.

Thus, the average or D.C. component of the first four pulses of the group of pulses at the output of sampling gate 41 is stored across condenser 43 while the average value of the last four pulses of said pulse group is stored across condenser 42. In the event that the received and reference signals are in time alignment at their respective inputs to phase detector 38, as represented by the aligned matrices A and B of FIG. 4, an equal D.C. potential of the same polarity will be simultaneously stored across condensers 42 and 43. The potential across condenser 42 energizes relay 45 while the potential across condenser 43 energizes relay 46. Arms 47 and 49 of relays 45 and 46, respectively, are shown in their energized position.

The potential across condensers 42 and 43 are algebraically summed by means of adder 51. The output of adder 51 energizes relay 52, whose arm 53 is also shown in the energized position. A continuous conductive path is formed when relays 45, 52, and 46 are simultaneously energized which, in combination with potential source 56, energizes indicating lamp 55. Thus, when lamp 55 is energized, it indicates that condensers 42 and 43 are charged with a voltage of the same polarity, which condition uniquely occurs when the signal and reference inputs to phase detector 38 are as represented by the aligned matrices B and A, respectively, of FIG. 4.

Upon the reception of a phase coded pulsed carrier signal, as represented by matrix F of FIG. 4, the operation is as follows: If the received signal and reference signal inputs to phase detector 38 may be represented by the respective aligned matrices F and E of FIG. 4, no D.C. output will be produced by sampling gate 41 and none of the relays 45, 52 and 46 will be energized. If, on the other hand, the reference signal as generated by phase coder 26, is out of time alignment with the received signal as represented by matrix F, so that the shaded or unshaded corresponding portions of matrices E and F occur simultaneously at phase detector 38, the signal and reference inputs thereto will be in precise time alignment over half of their respective matrices. A signal having a D.C. component will be produced at the output of sampling gate 41 during the time that the signal and reference matrices are in alignment, i.e., during the time of the first four pulses of the received signal if the unshaded portions of matrices F and E are aligned, or during the last four pulses of the received signals if the shaded portions of matrices F and E are aligned.

Assuming that waveform F represents the received signal and waveform E represents the reference signal and, furthermore, that the unshaded portions thereof are in time alignment, the signal output of sampling gate 41 will be zero for the last four received pulses (inasmuch as there is no corresponding reference signal at phase detector 38 at such time). During the first four pulses of the received signal, however, the received and reference signal will simultaneously occur in precise time alignment at phase detector 38 and a signal having a D.C. component will be directed to condenser 42 by means of de-energized synchronous switch 34. Relay 45 will be energized by the potential across condenser 42 while relay 46 will be de-energized by the absence of potential across condenser 43. Relay 52 will be energized by the contribution of the potential across condenser 42. Inasmuch as three conditions are required for the energizing of indicator lamp 55, however, no indication will result.

A similar situation exists wherein the shaded portion of matrices E and F are in alignment whereupon there will be a voltage produced across condenser 43 but not across condenser 42. In this case, relays 46 and 52 will be energized and relay 45 will be de-energized. Again, no illumination of lamp 55 is produced.

In summary, no D.C. signal component is produced at the output of sampling gate 41 in the event that the matrices defining the signal and reference inputs to phase detector 38 are not in time alignment. The single exception to this occurs in the event that corresponding portions of the signal and reference inputs are in alignment. In the case of this exception, however, a D.C. signal will be produced across only one but not both of the condensers 42 and 43. A D.C. potential is produced across both said condensers only in the case wherein the received and reference signal matrices are in entire time alignment whereupon a unique indication is produced by lamp 55 in response to the simultaneous energization of relays 45, 52, and 46.

For purposes of simplicity and clarity, the matrices defining the desired and undesired phase coded pulsed carrier signals are shown in FIG. 4 as matrices E and F, having corresponding halves. The present invention also contemplates the generation of desired and undesired signal matrices which have corresponding portions resulting from cyclic permutation of respective columns, which portions are other than halves of the total respective matrices.

It can be seen from the preceding specification that the objects of the present invention have been achieved by the provision of a receiver adapted to receive a plurality of phase coded pulsed carrier signals and operative to cross-correlate said signals with a locally generated reference signal defined by the same matrix and that describing the desired one of said plurality of signals. The receiver of a preferred embodiment of the present invention also includes timing apparatus for the production of various gating waveforms which together cooperate to divert corresponding portions of the grouped phase coded pulsed carrier signals to first and second signal integrating devices. An unambiguous indication is produced by monitoring the individual D.C. signals produced by said two signal integrators and energizing an indicator in the sole event that the integrated D.C. signals simultaneously occur with the same polarity.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus adapted to receive a plurality of phase coded pulsed carrier signals and operative to selectively respond to a desired one of said carrier signals, said apparatus including means for receiving said carrier signals, means for generating a local phase coded signal having the same phase characteristics as said desired carrier signal, means connected to said means for receiving and to said means for generating for cross-correlating the received pulse signals with said local signal to produce a pulsed output signal proportional in amplitude to a function of the instantaneous phase angles between said received signals and said local signal, pulse gating means connected to receive said pulsed output signal and operative to pass said pulsed output signal in response to control pulses, said source for generating said local signal including a source of control pulses, means for connecting said control pulse source to said gating means, first and second signal integrating means, switching means coupled to said gating means and to both said signal integrating means for alternatively connecting said gating means to a different one of said signal integrating means according to whether or not said switching means is energized, said switching means being energized for a portion of the time that said gating means is rendered operative, means connected to both said signal integrating means for monitoring the amplitude and polarity of the signals stored in said signal integrating means, said monitoring means producing an output signal when both said signals stored in said signal integrating means are simultaneously of the same polarity, and indicating means connected to said monitoring means and adapted to receive said output signal.

2. Apparatus as defined in claim 1 wherein said means for cross-correlating said received pulse signals with said local signal comprises a phase detector having two inputs and an output, said received pulse signals being applied to a first input, said local signal being applied to the other input, and said output being connected to said pulse gating means.

3. Apparatus as defined in claim 1 wherein said first and second signal integrating means each comprises a condenser.

4. Apparatus adapted to receive a plurality of grouped phase coded pulsed carrier signals and operative to selectively respond to a desired one of said grouped carrier signals, each signal group occupying a predetermined time interval, said apparatus including means for receiving said grouped carrier signals, means for generating a local grouped phase coded signal having the same phase characteristics as said desired carrier signal and having the same group interval as that of said desired carrier signal, means connected to said means for receiving and to said means for generating for cross-correlating the received signal with said local signal to produce a pulsed output signal proportional in amplitude to a function of the instantaneous phase angles between said received signals and said local signal, first and second signal integrating means, switching means connected to said means for cross-correlating and to said first and second signal integrating means for alternatively connecting the output of said cross-correlating means to a different one of said signal integrating means according to whether or not said switching means is energized, said switching means being energized for a portion of said time interval of said local signal, means connected to both said signal integrating means for separately monitoring the amplitude and polarity of the signals stored in said signal integrating means, said monitoring means producing an output signal when both said signals stored in said integrators are simultaneously of similar polarity, and indicating means connected to receive said output signal.

5. Apparatus adapted to receive a plurality of phase coded pulsed carrier signals and operative to selectively respond to a desired one of said carrier signals, said apparatus including means for generating a local phase coded signal having the same phase characteristics as said desired carrier signal, means coupled to receive said carrier signals and connected to said means for generating for cross-correlating said carrier signal with said local signal to produce a pulsed output signal proportional in amplitude to a function of the instantaneous phase angles between said carrier signal and said local signal, gating means connected to receive said pulsed output signal and operative to pass said pulsed output signal in response to control pulses, said source for generating said local signal including a source of control pulses, means for connecting said control pulse source to said gating means, first and second condensers, first switching means connected to said gating means and to both said condensers for alternatively connecting said gating means to a different one of said condensers depending on the state of energization of said first switching means, said first switching means being energized for a portion of the time that said gating means is rendered operative, second and third switching means respectively connected across said first and second condensers, means connected to both said condensers for summing the signal stored in said condensers, fourth switching means connected to the output of said signal means for summing and means connected to said second, third and fourth switching means and responsive to the simultaneous operation of said second, third, and fourth switching means for producing an indication.

6. Apparatus adapted to receive a plurality of grouped phase coded pulsed carrier signals and operative to selectively respond to a desired one of said grouped carrier signals, each signal group occupying a predetermined time interval, said apparatus including means for generating a local grouped phase coded signal having the same phase characteristics as said desired carrier signal and having the same group interval as that of said desired carrier signal, a phase detector having first and second inputs and producing an output, said carrier signals being applied to one of said inputs and said local signal being applied to the other of said inputs, said phase detector producing a pulsed output signal proportional in amplitude to the cosine of the instantaneous phase angles between said carrier signals and said local signal, first and second signal integrating means, first switching means connected to said phase detector and to both said signal integrating means for alternatively connecting the output of said phase detector to a different one of said signal integrators depending on the state of energization of said first switching means, said first switching means being energized for a portion of said time interval of said local signal, second and third swtching means operatively connected respectively to said first and second integrating means, means connected to both said integrating means for summing the signals stored in said integrating means, fourth switching means connected to the output of said signal summing means, and means connected to said second, third and fourth switching means and responsive to the simultaneous operation of said second, third, and fourth switching means for producing an indication.

7. Apparatus adapted to receive a plurality of phase coded carrier signals and operative to selectively respond to a desired one of said carrier signals, each said carrier signal occupying a predetermined time interval, sad apparatus including means for generatng a local phase coded signal having the same phase characteristics as said desired carrier signal, means coupled to receive said carrier signals and connected to said means for generating for cross-correlating said carrier signals with said local signal to produce an output signal proportional to a function of the instantaneous phase angles between said carrier signals and said local signal, means connected to said means for cross-correlating for separately integrating first and second alternately occurring portions of said output signal, and means connected to said means for integrating for individually monitoring the amplitude of the integrated output signal portions, said last means being operative to produce an indication when said integrated output signal portions are both other than zero.

8. Apparatus adapted to receive a plurality of phase coded pulsed carrier signals and operative to selectively respond to a desired one of said carrier signals, each said carrier signal occupying a predetermined time interval, said apparatus including means for generating a local phase coded signal having the same phase characteristics as said desired carrier signal, means coupled to receive said carrier signals and connected to said means for generating for cross-correlating said carrier signals with said local signal to produce a pulsed output signal proportional to a function of the instantaneous phase angles between said carrier signals and said local signal, gating means connected to receive said pulse output signal and operative to pass said pulsed output signal in response to control pulses, said means for generating said local signal including a source of control pulses, means for connecting said control pulse source to said gating means, means for separately integrating first and second alternately occurring portions of said passed output signal, said means for integrating being connected to the output of said gating means, and means connected to said means for integrating for individually monitoring the amplitude of the integrated signal portions, said last means being operative to produce an indication when said integrated signal portions are both other than zero.

9. Apparatus adapted to receive a plurality of phase coded carrier signals and operative to selectively respond to a desired one of said carrier signals, said apparatus including means for generating a local phase coded signal having the same phase characteristics as said desired carrier signal, means coupled to receive said carrier signals and connected to said means for generating for cross-correlating said carrier signals with said local signal to produce an output signal proportional to a function of the instantaneous phase angles between said carrier signals and said local signal, means connected to said means for cross-correlating for separately integrating first and second alternately occurring portions of said output signal, and means connected to said means for integrating for monitoring the amplitudes of the integrated output signal portions, said last means being operative to produce an indication when said integrated signal portions are both of the same polarity.

References Cited in the file of this patent

UNITED STATES PATENTS

| | | |
|---|---|---|
| 2,272,840 | Hammond et al. | Feb. 10, 1942 |
| 2,312,897 | Guanella et al. | Mar. 2, 1943 |
| 2,408,692 | Shore | Oct. 1, 1946 |
| 2,580,148 | Wikler | Dec. 25, 1951 |
| 2,643,819 | Le et al. | June 30, 1953 |
| 2,718,638 | De Rosa et al. | Sept. 20, 1955 |
| 2,800,583 | Gerks | July 23, 1957 |